(12) United States Patent
Li

(10) Patent No.: US 12,080,082 B2
(45) Date of Patent: Sep. 3, 2024

(54) ACT-OF-LOOKING-ASIDE DETERMINATION DEVICE

(71) Applicant: HONDA MOTOR CO., LTD., Tokyo (JP)

(72) Inventor: Yiyang Li, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 380 days.

(21) Appl. No.: 17/676,833

(22) Filed: Feb. 22, 2022

(65) Prior Publication Data

US 2022/0319201 A1  Oct. 6, 2022

(30) Foreign Application Priority Data

Mar. 31, 2021  (JP) ................................. 2021-059324

(51) Int. Cl.
*G06V 20/59* (2022.01)
*G06T 7/70* (2017.01)
*G06V 20/58* (2022.01)
*G07C 5/02* (2006.01)

(52) U.S. Cl.
CPC .............. *G06V 20/597* (2022.01); *G06T 7/70* (2017.01); *G06V 20/58* (2022.01); *G07C 5/02* (2013.01); *G06T 2207/30201* (2013.01); *G06T 2207/30268* (2013.01); *G06V 2201/08* (2022.01)

(58) Field of Classification Search
CPC .. G06V 20/597; G06V 20/58; G06V 2201/08; G06T 7/70; G06T 2207/30201; G06T 2207/30268; G07C 5/02

USPC ......................................................... 382/103
See application file for complete search history.

(56) References Cited

U.S. PATENT DOCUMENTS

| 2012/0057749 | A1 | 3/2012 | Takahashi et al. |
| 2018/0326999 | A1* | 11/2018 | Hershkovitz .......... G06V 40/20 |
| 2020/0152197 | A1* | 5/2020 | Penilla ................... H04L 67/125 |
| 2023/0136710 | A1* | 5/2023 | Guberman ........... G06V 10/762 |
| | | | 701/450 |

FOREIGN PATENT DOCUMENTS

JP          5184596 B2    4/2013

* cited by examiner

*Primary Examiner* — Allen H Nguyen
(74) *Attorney, Agent, or Firm* — CKC & PARTNERS CO., LLC

(57) ABSTRACT

In an act-of-looking-aside determination device, when a route change detector detects a route change of an own vehicle, an act-of-looking-aside determiner refrains from determining that a driver is in an act-of-looking-aside state even when a line-of-sight direction of the driver deviates from a determination reference range after the line-of-sight direction of the driver detected by a line-of-sight direction detector is detected as a line-of-sight direction toward at least one of a rearview mirror R and a side mirror determined based on a relative position between the own vehicle and another vehicle, the rearview mirror and the side mirror being provided in the own vehicle. Thus, even when the line of sight of the driver is turned to the rearview mirror or the side mirror during a route change of the own vehicle, an erroneous determination on an act-of-looking-aside state can be prevented.

5 Claims, 4 Drawing Sheets

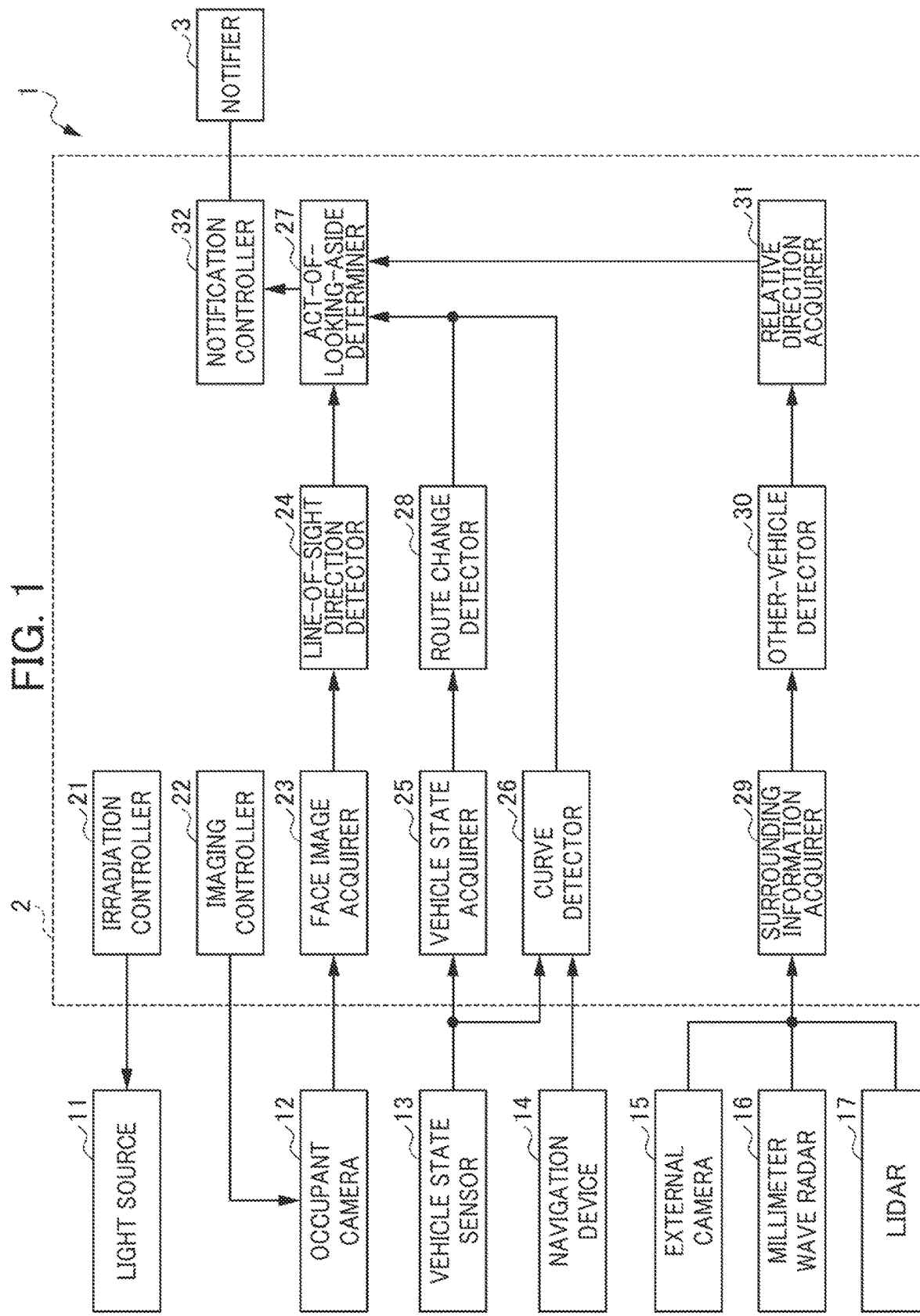

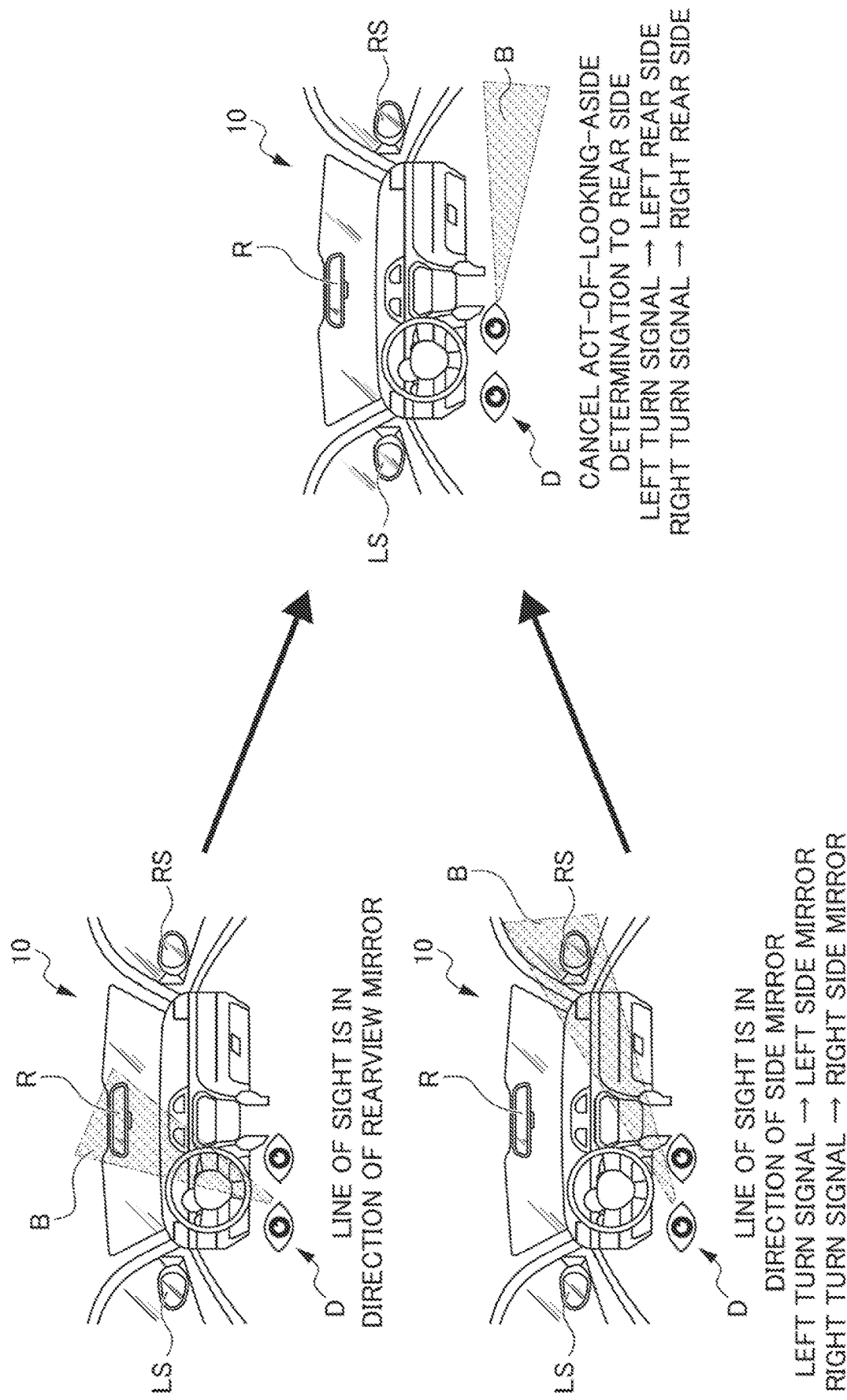

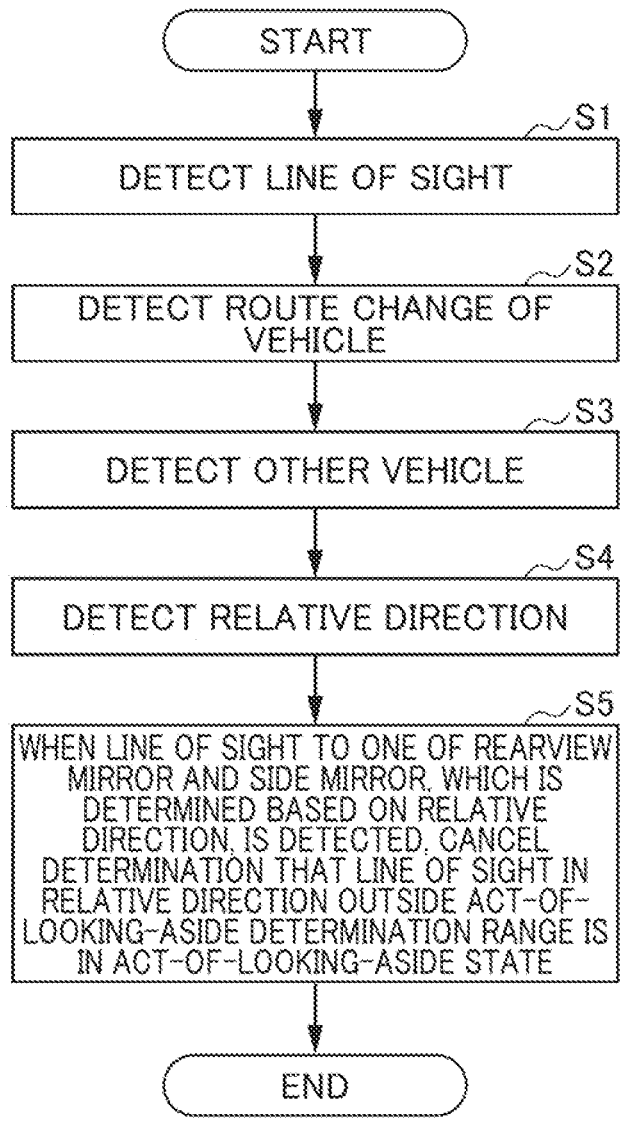

ACT-OF-LOOKING-ASIDE DETERMINATION DEVICE

This application is based on and claims the benefit of priority from Japanese Patent Application No. 2021-059324, filed on 31 Mar. 2021, the content of which is incorporated herein by reference.

BACKGROUND OF THE INVENTION

Field of the Invention

The present invention relates to an act-of-looking-aside determination device.

Related Art

In recent years, various act-of-looking-aside determination devices have been proposed for determining whether a driver is in an act-of-looking-aside state. The applicant has already proposed an act-of-looking-aside determination device to prevent from erroneously determining a non-act-of-looking-aside state as an act-of-looking-aside state by displacing a target range related to the determination on the act-of-looking-aside state by a predetermined amount at a timing before a vehicle behavior changes and a turning direction of the vehicle changes to a curve direction (see, for example, Patent Document 1).

Patent Document 1: Japanese Patent No. 5184596

SUMMARY OF THE INVENTION

According to the act-of-looking-aside determination device disclosed in Patent Document 1, it is possible to improve the accuracy in determining whether the driver is in an act-of-looking-aside state even in the event of entering a curve or passing through a curve. When the line of sight of the driver is turned to the rearview mirror or the side mirrors during a route change, such as a lane change, of the own vehicle, such a line of sight may lead to a determination as being in an inattentive driving state. However, such a point is not particularly mentioned as a technical problem in the technique disclosed in Patent Document 1.

The present invention has been made in view of the above circumstances, and is directed to providing an act-of-looking-aside determination device capable of preventing an erroneous determination on an act-of-looking-aside state in that a line of sight is determined as being in an act-of-looking-aside state when the line of sight of a driver is turned to a rearview mirror or a side mirror during a route change of the own vehicle.

(1) The present invention provides a act-of-looking-aside determination device including: a line-of-sight direction detector (for example, a line-of-sight direction detector 24 to be described below) that detects a line-of-sight direction of a driver; an act-of-looking-aside determiner (for example, an act-of-looking-aside determiner 27 to be described below) that determines that the driver is in an act-of-looking-aside state when the line-of-sight direction detected by the line-of-sight direction detector deviates from a predetermined determination reference range; a route change detector (for example, a route change detector 28 to be described below) that detects a route change of an own vehicle; a surrounding vehicle detector (for example, a surrounding information acquirer 29 and an other-vehicle detector 30 to be described below) that detects another vehicle around the own vehicle; and a vehicle state acquirer (for example, a vehicle state acquirer 25 to be described below) that acquires information related to a vehicle state of the own vehicle, wherein when the route change detector detects the route change of the own vehicle, the act-of-looking-aside determiner refrains from determining that the driver is in the act-of-looking-aside state even when the line-of-sight direction of the driver deviates from the determination reference range after the line-of-sight direction of the driver detected by the line-of-sight direction detector is detected as a line-of-sight direction toward at least one of a rearview mirror (for example, a rearview mirror R to be described below) and a side mirror (for example, a right side mirror RS or a left side mirror LS to be described below) determined based on a relative position between the own vehicle and the other vehicle, the rearview mirror and the side mirror being provided in the own vehicle.

(2) In the act-of-looking-aside determination device of (1) described above, the route change detector detects a lane change of the own vehicle, as the route change of the own vehicle, and when the route change detector detects the lane change of the own vehicle, the act-of-looking-aside determiner refrains from determining that the driver is in the act-of-looking-aside state even when the line-of-sight direction of the driver deviates from the determination reference range after the line-of-sight direction of the driver detected by the line-of-sight direction detector is detected as a line-of-sight direction toward at least one of the rearview mirror and the side mirror determined based on the relative position between the own vehicle and the other vehicle, the rearview mirror and the side mirror being provided in the own vehicle.

(3) In the act-of-looking-aside determination device of (1) described above, when a distance in an extending direction of a lane between the own vehicle and the other vehicle detected by the surrounding vehicle detector is larger than a predetermined threshold value, the act-of-looking-aside determiner refrains from determining the driver is in the act-of-looking-aside state even when the line-of-sight direction of the driver deviates from the determination reference range after the line-of-sight direction detector detects that the line-of-sight direction of the driver is directed to the rearview mirror, and when the distance in the extending direction of the lane between the own vehicle and the other vehicle detected by the surrounding vehicle detector is smaller than the predetermined threshold value, the act-of-looking-aside determiner refrains from determining that the driver is in the act-of-looking-aside state even when the line-of-sight direction of the driver deviates from the determination reference range after the line-of-sight direction detector detects that the line-of-sight direction of the driver is directed to the side mirror.

(4) In the act-of-looking-aside determination device of (3) described above, the predetermined threshold value is variably set based on information related to a shape of a road on which own vehicle is traveling.

(5) In the act-of-looking-aside determination device of (1) described above, the route change detector detects the route change of the own vehicle based on a blinking state of a direction indicator of the vehicle and/or a steering state of the vehicle.

In the act-of-looking-aside determination device of (1), when the route change detector detects the route change of the own vehicle, the act-of-looking-aside determiner refrains from determining that the driver is in the act-of-looking-aside state even when the line-of-sight direction of the driver deviates from the determination reference range after the line-of-sight direction of the driver detected by the line-ofsight direction detector is detected as a line-of-sight direction toward at least one of the rearview mirror and the side mirror determined based on the relative position between the own vehicle and the other vehicle, the rearview mirror and the side mirror being provided in the own vehicle. Thus, when the line of sight of the driver is turned to the rearview mirror or the side mirror during the route change of the own vehicle, it is possible to prevent the erroneous determination on the act-of-looking-aside state in that the line of sight is determined as being in an act-of-looking-aside state.

According to the act-of-looking-aside determination device of (2), in the act-of-looking-aside determination device of (1) described above, particularly, when the route change detector detects the lane change of the own vehicle, it is not determined that the driver is in the act-of-looking-aside state even when the line-of-sight direction of the driver deviates from the determination reference range after the line-of-sight direction of the driver detected by the line-of-sight direction detector is detected as a line-of-sight direction toward at least one of the rearview mirror and the side mirror determined based on the relative position between the own vehicle and the other vehicle, the rearview mirror and the side mirror being provided in the own vehicle. When the line of sight of the driver is turned to the rearview mirror or the side mirror during the lane change of the own vehicle, it is possible to prevent the erroneous determination on the act-of-looking-aside state in that the line of sight is determined as being in an act-of-looking-aside state.

According to the act-of-looking-aside determination device of (3), in the act-of-looking-aside determination device of (1) described above, further, when the distance in the extending direction of the lane between the own vehicle and the other vehicle is larger than the predetermined threshold value, the act-of-looking-aside determiner refrains from determining that the driver is in the act-of-looking-aside state even when the line-of-sight direction of the driver deviates from the determination reference range after the line-of-sight direction detector detects that the line-of-sight direction of the driver is directed to the rearview mirror, and when the distance in the extending direction of the lane between the own vehicle and the other vehicle is smaller than the predetermined threshold value, the act-of-looking-aside determiner refrains from determining that the driver is in the act-of-looking-aside state even when the line-of-sight direction of the driver deviates from the determination reference range after the line-of-sight direction detector detects that the line-of-sight direction of the driver is directed to the side mirror. Thus, it is possible to prevent the erroneous determination on the act-of-looking-aside state in that the line of sight is determined as being in the act-of-looking-aside state when the line of sight of the driver is turned to the rearview mirror or the side mirror during the route change of the own vehicle.

According to the act-of-looking-aside determination device of (4), in the act-of-looking-aside determination device of (3) described above, particularly, the predetermined threshold value is variably set based on the information related to the shape of the road on which own vehicle is traveling. Thus, depending on the shape of the road such as the curvature of the curve, a condition is appropriately set that the act-of-looking-aside determiner refrains from determining that the driver is in the act-of-looking-aside state even when the line-of-sight direction of the driver deviates from the determination reference range.

According to the act-of-looking-aside determination device of (5), in the act-of-looking-aside determination device of (1) described above, particularly, the route change detector detects the route change of the own vehicle based on the blinking state of the direction indicator of the vehicle and/or the steering state of the vehicle. Therefore, the route change of the own vehicle can be detected at an appropriate timing, and thus, it is possible to make a more appropriate determination on an act-of-looking-aside state.

BRIEF DESCRIPTION OF THE DRAWINGS

FIG. 1 is a diagram showing a configuration of an act-of-looking-aside determination device according to an embodiment of the invention;

FIG. 2 is a diagram illustrating a state in which a line of sight of a driver is selectively turned to a rearview mirror or a side mirror according to a distance between an own vehicle and another vehicle in an extending direction of a lane;

FIG. 3 is a diagram illustrating a state of canceling a determination that movement of the line of sight of the driver of own vehicle in FIG. 2 is in an act-of-looking-aside state; and FIG. 4 is a flowchart showing an example of processing performed by a processing device of the act-of-looking-aside determination device according to the embodiment of the present invention.

DETAILED DESCRIPTION OF THE INVENTION

Hereinafter, the present invention will be clarified by a detailed description of an act-of-looking-aside determination device according to an embodiment of the present invention. FIG. 1 is a diagram showing a configuration of an act-of-looking-aside determination device 1 according to an embodiment of the invention. The act-of-looking-aside determination device 1 is provided in a vehicle, and includes a processing device 2, a notifier 3, a light source 11, an occupant camera 12, a vehicle state sensor 13, a navigation device 14, an external camera 15, a millimeter wave radar 16, and an LIDAR 17.

The light source 11 irradiates an imaging target (for example, a face of a driver seated in a driver's seat) with light such as visible light or infrared rays.

The occupant camera 12 is installed to come at least a face of the driver seated in the driver's seat within an imaging field of view, and obtains a video output including the face of the driver in a visible light region or an infrared region.

The vehicle state sensor 13 includes a vehicle velocity sensor, a gyro sensor, a yaw rate sensor, a steering angle sensor, a left direction indicator operation state sensor, and a right-direction-indicator operation state sensor. The vehicle velocity sensor detects a velocity (vehicle velocity) of the own vehicle, the gyro sensor detects a posture of a vehicle body or a traveling direction, and the yaw rate sensor detects a yaw rate (rotating angular velocity of axial rotation in an up and down direction of a gravity center of the vehicle). Further, the steering angle sensor detects a steering angle of a steering wheel operated by the driver or an actual steering angle (turning angle) according to the steering angle of the steering wheel. Further, the left-direction-indicator operation state sensor and the right-direction-indicator operation state sensor detect operation statuses of left and right direction indicators, respectively. The vehicle state sensor 13 supplies detection signals related to the vehicle velocity, the posture, the yaw rate, the steering angle and turning angle, the operation statuses of the left and right direction indicators, which are various kinds of vehicle information detected as described above, to the processing device 2.

The navigation device 14 receives a positioning signal such as a GPS (Global Positioning System) signal for measuring the position of the own vehicle using artificial satellites, for example, and calculates a current position of the own vehicle based on the positioning signal. The navigation device 14 calculates the current position of the own vehicle by a calculation process of dead reckoning based on the detection signals of the velocity (vehicle velocity) and the yaw rate of the own vehicle output from the vehicle velocity sensor and the yaw rate sensor (not shown) of the vehicle state sensor 13.

The navigation device 14 includes road coordinate data, as map data, required for a map matching process based on the current position of the own vehicle. Further, the navigation device 14 includes data, as the map data, necessary for a process such as a route search or a route guide, the data being road data of nodes that are coordinate points formed of latitude and longitude of a predetermined position such as an intersection and a junction, links connecting nodes to each other, a distance between the links, and a shape (for example, information about a radius of curvature of a curve), a width, an intersection angle, and a kind of road.

The external camera 15 is installed to come at least an outside of the vehicle including surroundings of the vehicle within an imaging field of view, and acquires imaging information in a visible light region or an infrared region. Although the external camera 15 is typically shown as one block in FIG. 1, a plurality of external cameras is provided according to specifications of the vehicle described above.

The millimeter wave radar 16 detects a target around the vehicle described above, and measures a distance from the target. Although the millimeter wave radar 16 is typically shown as one block in FIG. 1, a plurality of millimeter wave radars is provided according to specifications of the vehicle described above.

The light detection and ranging (LIDAR) 17 detects a target around the vehicle, and measures a distance from the target. Although the LIDAR 17 is typically shown as one block in FIG. 1, a plurality of LIDARs is provided according to specifications of the vehicle described above.

The processing device 2 includes an irradiation controller 21, an imaging controller 22, a face image acquirer 23, a line-of-sight direction detector 24, a vehicle state acquirer 25, a curve detector 26, an act-of-looking-aside determiner 27, a route change detector 28, a surrounding information acquirer 29, an other-vehicle detector 30, a relative direction detector 31, and a notification controller 32.

The irradiation controller 21 controls irradiation with light by the light source 11. The imaging controller 22 controls the occupant camera 12 to capture an image. The face image acquirer 23 acquires a face image output from the occupant camera 12. The line-of-sight direction detector 24 performs a recognition process such as feature quantity calculation and shape determination on a detection target, left and right eyeballs of the driver, from the face image acquired by the face image acquirer 23. The line-of-sight direction detector 24 further detects, based on the result of the recognition process, a line of sight and a gaze point of the driver by a predetermined line-of-sight detecting process using, for example, a center position of the irises and pupils of the eyes, a center position of a Purkinje image that is a reflection image of infrared rays on the cornea surface, a center position of the eyeballs, and positions of edges of eyelids.

The vehicle state acquirer 25 acquires vehicle state information about various states of the own vehicle based on the signals of the various detection results output from the vehicle state sensor. In other words, the vehicle state acquirer 25 acquires, as information of a driving behavior of the own vehicle, information on a velocity of the own vehicle (vehicle velocity), a posture of a vehicle body, a traveling direction and turning direction, and an actual steering angle (turning angle) according to a steering angle of a steering wheel (steering angle), and information related to the operation status of the left and right direction indicators.

The curve detector 26 detects the presence or absence of a curve in front of the vehicle within a predetermined distance (for example, a distance within 2 seconds until reaching an entrance of a curve) from the own vehicle and detects a curve direction of the curve, based on the road data of the navigation device 14 or any one of the steering angle of the steering wheel and the actual steering angle (turning angle) according to the steering angle of the steering wheel output from the vehicle state sensor 13, and issues a determination reference range change command to the act-of-looking-aside determiner 27 to change a determination reference range (to be described below) not corresponding to the act-of-looking-aside state.

The curve detector 26 also detects a curvature of the curve in addition to the presence or absence of the curve in front of the vehicle within a predetermined distance from the own vehicle and the curve direction of the curve.

The act-of-looking-aside determiner 27 determines, based on the line-of-sight direction of the driver detected by the line-of-sight direction detector 24, whether the driver is in an inattention state such as an act-of-looking-aside state. In other words, the act-of-looking-aside determiner 27 determines whether the line-of-sight direction of the driver is within a determination reference range not corresponding to the act-of-looking-aside state. When it is determined that the line-of-sight direction of the driver is out of the determination reference range for a predetermined time or longer, the act-of-looking-aside determiner 27 further issues a determination output of the act-of-looking-aside state. On the other hand, when it is determined that the line-of-sight direction of the driver is within the determination reference range, the act-of-looking-aside determiner 27 issues a determination output of a non-act-of-looking-aside state.

The determination reference range in the act-of-looking-aside determiner 27 is changed according to the situation of the curve by the determination reference range change command received from the curve detector 26. Thus, the determination on the act-of-looking-aside state by the act-of-looking-aside determiner 27 becomes suitable for the situation of the curve.

The route change detector 28 detects whether the own vehicle is in the route change state including a lane change, based on the information on the steering angle and/or turning angle of the own vehicle and the information related to the operation status of the left and right direction indicators which are the vehicle state information acquired by the vehicle state acquirer 25, and issues a command to the act-of-looking-aside determiner 27 to change the determination reference range in the act-of-looking-aside determiner 27 by a predetermined amount when it is determined that the own vehicle is in the route change state.

The surrounding information acquirer 29 acquires surrounding information related a state around the own vehicle from the external camera 15, the millimeter wave radar 16, and the LIDAR 17. The surrounding information is, for example, information on the presence or absence of other vehicles or other obstacles in front, side, and rear of the own vehicle, or information on a distance to the existing other vehicle or other obstacles and an orientation. The surrounding information acquirer 29 supplies the acquired surrounding information to the other-vehicle detector 30.

Based on the surrounding information supplied from the surrounding information acquirer 29, the other-vehicle detector 30 detects the presence or absence and the relative position of the other vehicle related to the traveling of the own vehicle, and issues the detection information. In other words, the surrounding information acquirer 29 and the other-vehicle detector 30 constitute a surrounding vehicle detector that detects another vehicle around the own vehicle.

When the presence of another vehicle is detected by the other-vehicle detector 30, the relative direction detector 31 acquires, based on the detection output of the other-vehicle detector 30, relative direction information indicating a relative direction of the other vehicle as viewed from the own vehicle by an arithmetic operation, and supplies the relative direction information to the act-of-looking-aside determiner 27. The relative direction detector 31 not only supplies the relative direction information to the act-of-looking-aside determiner 27, but also supplies the detection information regarding the presence or absence of the other vehicle related to the traveling of the own vehicle and the relative position as it is to the act-of-looking-aside determiner 27 from the other-vehicle detector 30.

In response to a command from the route change detector 28 to cancel the determination on the act-of-looking-aside state in a specific case, the act-of-looking-aside determiner 27 cancels the determination of the act-of-looking-aside state even when the line-of-sight direction of the driver detected by the line-of-sight direction detector 24 deviates from the determination reference range.

Specifically, when the route change detector 28 detects the route change of the own vehicle, the act-of-looking-aside determiner 27 refrains from determining that the driver is in the act-of-looking-aside state even when the line-of-sight direction of the driver deviates from the determination reference range after the line-of-sight direction of the driver detected by the line-of-sight direction detector 24 is detected as a line-of-sight direction toward at least one of a rearview mirror and side mirrors determined based on the relative position between the own vehicle and the other vehicle, the rearview mirror and the side mirrors being provided in the own vehicle. In this case, the relative position between the own vehicle and the other vehicle is extracted from the detection information regarding the presence or absence of the other vehicle related to the traveling of the own vehicle and the relative position supplied through the relative direction detector 31 from the other-vehicle detector 30. Further, the above-described operation in the act-of-looking-aside determiner 27 is also applied to a case where the route change of the own vehicle is, particularly, a lane change of the own vehicle.

Here, upon receiving, from the relative direction detector 31, the relative direction information indicating the relative direction of the other vehicle as viewed from the own vehicle as described above, the act-of-looking-aside determiner 27 issues the determination output of the non-act-of-looking-aside state even when the line-of-sight direction detected by the line-of-sight direction detector 24 is out of the determination reference range for the predetermined time or longer.

The determination output of the act-of-looking-aside determiner 27 is supplied to the notification controller 32.

When the determination output supplied from the act-of-looking-aside determiner 27 is the determination output of the act-of-looking-aside state, the notification controller 32 gives an alarm issuing control command to the notifier 3 and controls a form of alarm issuing in the notifier 3. An example of the form of the alarm issuing in the notifier 3 includes strength/weakness and an intermittent cycle of an alarm sound, sounding of a message, a light emission and a character display of a warning light, or a pattern display.

When performing notification under the control of the notification controller 32, the notifier 3 stops the notification at a timing when the relative direction detector 31 starts the arithmetic operation related to the acquisition of the relative direction. At the timing when the relative direction detector starts the arithmetic operation related to the detection of the relative direction, it is highly probable that the driver of the own vehicle is turning his/her line of sight for safety confirmation, and thus the notification such as an alarm in the notifier is stopped at this timing. Thus, notifications such as unnecessary alarms are prevented, and comfortability during driving is hardly hindered.

FIG. 2 is a diagram illustrating a state in which the line of sight of the driver is selectively turned to the rearview mirror or the side mirrors according to a distance between the own vehicle and the other vehicle in an extending direction of the lane. In FIG. 2, it is assumed that a first other vehicle 91 is traveling at a relatively short distance from the rear of the own vehicle 10 and a second other vehicle 92 is traveling at a relatively long distance.

The driver of the own vehicle 10 blinks a right direction indicator RT with the intention of a lane change to the right lane. In order for the driver of the own vehicle 10 to confirm the first other vehicle 91 traveling at a relatively short distance, the driver turns his/her line of sight to the right side mirror of the own vehicle. On the other hand, in order for the driver to confirm the second other vehicle 92 traveling at a relatively long distance, the driver turns his/her line of sight to the rearview mirror of the own vehicle.

On the other hand, the surrounding information acquirer 29 and the other-vehicle detector 30 of the own vehicle 10 grasp the presence of the first other vehicle 91 and the second other vehicle 92 and the relative position including the distance therebetween, and supply the grasped information to the act-of-looking-aside determiner 27 through the relative direction detector 31. The blinking of the right direction indicator RT in the own vehicle 10 is detected by the vehicle state sensor 13 and is acquired as vehicle state information by the vehicle state acquirer 25.

When the distance in the extending direction of the lane between the own vehicle and the other vehicle (second other vehicle 92) detected by the surrounding vehicle detector (including the surrounding information acquirer 29 and the other-vehicle detector 30) is larger than a predetermined threshold value, the act-of-looking-aside determiner 27 refrains from determining that the driver is in the act-of-looking-aside state even when the line-of-sight direction of the driver deviates from the determination reference range after the line-of-sight direction detector 24 detects that the line-of-sight direction of the driver is directed to the rearview mirror.

Further, when the distance in the extending direction of the lane between the own vehicle and the other vehicle (first other vehicle 91) detected by the surrounding vehicle detector (including the surrounding information acquirer 29 and the other-vehicle detector 30) is smaller than the predetermined threshold value, the act-of-looking-aside determiner 27 refrains from determining that the driver is in the actof-looking-aside state even when the line-of-sight direction of the driver deviates from the determination reference range after the line-of-sight direction detector 24 detects that the line-of-sight direction of the driver is directed to the side mirrors.

FIG. 3 is a diagram illustrating a state of canceling a determination that the movement of the line of sight of the driver of own vehicle 10 in FIG. 2 is in an act-of-looking-aside state. FIG. 3 schematically shows a state of, depending on whether the line-of-sight direction of a driver D of the own vehicle 10 is directed to a rearview mirror R or a right side mirror RS (or left side mirror LS), canceling a determination that the movement of the line of sight of the driver D in a direction related to such a direction is in an act-of-looking-aside state. In FIG. 3, as a spatial region to which the line of sight of the driver D is directed, a determination cancel region B is shown with hatching in which the act-of-looking-aside determiner 27 refrains from determining that the driver is in the act-of-looking-aside state even when the line of sight of the driver D deviates from the determination reference range.

When the driver D confirms the second other vehicle 92 traveling at a relatively long distance, the line of sight of the driver turns to the rearview mirror R. FIGS. 2 and 3, the driver D of the own vehicle 10 blinks the right direction indicator RT with the intention of the lane change to the right lane. In order to confirm the first other vehicle 91 traveling at a relatively short distance, the driver D turns his/her line of sight to the right side mirror RS. The line-of-sight direction of the driver D is constantly grasped by the line-of-sight direction detector 24 (FIG. 1). In addition, the first other vehicle 91 and the second other vehicle 92 are constantly grasped by the surrounding vehicle detector (including the surrounding information acquirer 29 and the other-vehicle detector 30).

In other words, when the driver D confirms the second other vehicle 92 traveling at a relatively long distance, the relative position of the second other vehicle 92 with respect to the own vehicle 10 is detected by the other-vehicle detector 30. The line-of-sight direction of the driver D to the rearview mirror R is detected by the line-of-sight direction detector 24. At this time, the act-of-looking-aside determiner 27 sets the determination cancel region B when the driver D visually recognizes the rearview mirror R. At the time of setting of the determination cancel region B, conditions of the setting are that the relative position of the other vehicle 92 detected by the other-vehicle detector 30 with respect to the own vehicle 10 is detected as a distance in the extending direction of the lane, and that such a distance is larger than a predetermined threshold value.

In addition, when the driver D confirms the first other vehicle 91 traveling at a relatively short distance, the relative position of the first other vehicle 91 with respect to the own vehicle 10 is detected by the other-vehicle detector 30. The line-of-sight direction of the driver D to the right side mirror RS is detected by the line-of-sight direction detector 24. At this time, the act-of-looking-aside determiner 27 sets the determination cancel region B when the driver D visually recognizes the right side mirror RS. At the time of setting of the determination cancel region B, conditions of the setting are that the relative position of the other vehicle 91 detected by the other-vehicle detector 30 with respect to the own vehicle 10 is detected as a distance in the extending direction of the lane, and that such a distance is shorter than a predetermined threshold value.

The predetermined threshold value described above is variably set according to the shape of the road on which own vehicle 10 is traveling, for example, based on the detection information related to the curvature of the curve from the curve detector 26. Thus, depending on the shape of the road such as the curvature of the curve, a condition is appropriately set that the act-of-looking-aside determiner refrains from determining that the driver is in the act-of-looking-aside state even when the line-of-sight direction of the driver deviates from the determination reference range.

When the driver D turns his/her line of sight toward the rear side from the right side mirror RS, the line-of-sight direction of the driver D at that moment is detected by the line-of-sight direction detector 24. The line-of-sight direction of the driver D toward the rear side from the right side mirror RS is detected by the line-of-sight direction detector 24. At this time, the act-of-looking-aside determiner 27 sets the determination cancel region B when the driver D visually recognizes the rear side from the right side mirror RS.

FIG. 5 is a flowchart showing an example of processing performed by the processing device 2 of the act-of-looking-aside determination device 1 according to the embodiment of the present invention. First, the line-of-sight direction detector 24 detects the line-of-sight direction of the driver by a predetermined line-of-sight detecting process (step S1).

Next, the route change detector 28 detects whether the own vehicle is in the route change state including a lane change, based on the information on the steering angle and/or turning angle of the own vehicle and the information related to the operation status of the left and right direction indicators which are the vehicle state information acquired by the vehicle state acquirer 25 (step S2).

Next, the surrounding vehicle detector including the surrounding information acquirer 29 and the other-vehicle detector 30 detects the presence or absence and the relative position of the other vehicle around the own vehicle (step S3).

Further, with respect to the other vehicle in which the presence of the other vehicle is detected by the other-vehicle detector 30, the relative direction detector 31 acquires, based on the detection output of the other-vehicle detector 30, relative direction information indicating a relative direction of the other vehicle as viewed from the own vehicle by an arithmetic operation, and supplies the relative direction information to the act-of-looking-aside determiner 27 (step S4).

The act-of-looking-aside determiner 27 receives, from the relative direction detector 31, the relative direction information indicating the relative direction of the other vehicle as viewed from the own vehicle as described above, and cancels the determination that the driver is in the act-of-looking-aside state even when the line-of-sight direction of the driver deviates from the determination reference range after being detected as a line-of-sight direction toward at least one of a rearview mirror and side mirrors determined based on the relative position between the own vehicle and the other vehicle, the rearview mirror and the side mirrors being provided in the own vehicle (step S5). Thus, when the line of sight of the driver is turned to the rearview mirror or the side mirrors during the route change of the own vehicle, an erroneous determination on the act-of-looking-aside state can be prevented in that the line of sight is determined as being in an act-of-looking-aside state.

According to the act-of-looking-aside determination device 1 of the present embodiment, the following effects are obtained.

In the act-of-looking-aside determination device 1 of (1), when the route change detector 28 detects the route change of the own vehicle 10, the act-of-looking-aside determiner 27 refrains from determining that the driver is in the act-of-looking-aside state even when the line-of-sight direction of the driver deviates from the determination reference range after the line-of-sight direction of the driver detected by the line-of-sight direction detector 24 is detected as a line-of-sight direction toward at least one of the rearview mirror R and the side mirror RS (LS) determined based on the relative position between the own vehicle 10 and the other vehicle 91 or 92, the rearview mirror and the side mirror being provided in the own vehicle 10. Thus, when the line of sight of the driver is turned to the rearview mirror R or the side mirror RS (LS) during the route change of the own vehicle 10, it is possible to prevent the erroneous determination on the act-of-looking-aside state in hat the line of sight is determined as being in the act-of-looking-aside state.

According to the act-of-looking-aside determination device 1 of (2), in the act-of-looking-aside determination device 1 of (1) described above, when the route change detector 28 particularly detects the lane change of the own vehicle 10, it is not determined that the driver is in the act-of-looking-aside state even when the line-of-sight direction of the driver deviates from the determination reference range after the line-of-sight direction of the driver detected by the line-of-sight direction detector 24 is detected as a line-of-sight direction toward at least one of the rearview mirror R and the side mirror RS (LS) determined based on the relative position between the own vehicle 10 and the other vehicle 91 or 92, the rearview mirror and the side mirror being provided in the own vehicle 10. When the line of sight of the driver is turned to the rearview mirror R or the side mirror RS (LS) during the lane change of the own vehicle 10, it is possible to prevent the erroneous determination on the act-of-looking-aside state in that the line of sight is determined as being in the act-of-looking-aside state.

According to the act-of-looking-aside determination device 1 of (3), in the act-of-looking-aside determination device 1 of (1) or (2) described above, further, when the distance in the extending direction of the lane between the own vehicle 10 and the other vehicle is larger than the predetermined threshold value, the act-of-looking-aside determiner 27 refrains from determining that the driver is in the act-of-looking-aside state even when the line-of-sight direction of the driver deviates from the determination reference range after the line-of-sight direction detector 24 detects that the line-of-sight direction of the driver is directed to the rearview mirror R, and when the distance in the extending direction of the lane between the own vehicle 10 and the other vehicle 91 or 92 is smaller than the predetermined threshold value, the act-of-looking-aside determiner 27 refrains from determining that the driver is in the act-of-looking-aside state even when the line-of-sight direction of the driver deviates from the determination reference range after the line-of-sight direction detector 24 detects that the line-of-sight direction of the driver is directed to the side mirror RS (LS). Thus, when the line of sight of the driver is turned to the rearview mirror R or the side mirror RS (LS) during the route change of the own vehicle 10, it is possible to prevent the erroneous determination on the act-of-looking-aside state in that the line of sight is determined as being in the act-of-looking-aside state.

According to the act-of-looking-aside determination device 1 of (4), in the act-of-looking-aside determination device 1 of (3) described above, particularly, the predetermined threshold value is variably set based on the information related to the shape of the road on which own vehicle 10 is traveling. Thus, depending on the shape of the road such as the curvature of the curve, a condition is appropriately set that the act-of-looking-aside determiner refrains from determining that the driver is in the act-of-looking-aside state even when the line-of-sight direction of the driver deviates from the determination reference range.

According to the act-of-looking-aside determination device 1 of (5), in the act-of-looking-aside determination device 1 of (1) described above, particularly, the route change detector 28 detects the route change of the own vehicle 10 based on the blinking state of the direction indicator TR of the vehicle and/or the steering state of the vehicle. Therefore, the route change of the own vehicle 10 can be detected at an appropriate timing, and thus, it is possible to make a more appropriate determination on an act-of-looking-aside state.

Although the embodiment of the present invention has been described above, the present invention is not limited to the embodiment. Within the scope of the present invention, the detailed configuration may be changed as appropriate. For example, when a request for the lane change to the traveling lane of the other vehicle is transmitted from the own vehicle by vehicle-to-vehicle communication, the movement of the line of sight to the rearview mirror or the side mirror may not be determined as being in an act-of-looking-aside state without any other conditions.

EXPLANATION OF REFERENCE NUMERALS 1 act-of-looking-aside determination device
2 processing device
3 notifier
10 own vehicle
11 light source
12 occupant camera
13 vehicle state sensor
14 navigation device
15 external camera
16 millimeter wave radar
17 LIDAR
21 irradiation controller
22 imaging controller
23 face image acquirer
24 line-of-sight direction detector
25 vehicle state acquirer
26 curve detector
27 act-of-looking-aside determiner
28 route change detector
29 surrounding information acquirer (part of surrounding vehicle detector)
30 other-vehicle detector (another part of surrounding vehicle detector)
31 relative direction detector
32 notification controller
91, 92 other vehicle
R rearview mirror
LS left side mirror
RS right side mirror

What is claimed is:
1. An act-of-looking-aside determination device comprising:
a line-of-sight direction detector that detects a line-of-sight direction of a driver;
an act-of-looking-aside determiner that determines that the driver is in an act-of-looking-aside state when the line-of-sight direction detected by the line-of-sight direction detector deviates from a predetermined determination reference range;

a route change detector that detects a route change of an own vehicle;

a surrounding vehicle detector that detects another vehicle around the own vehicle; and a vehicle state acquirer that acquires information related to a vehicle state of the own vehicle, wherein when the route change detector detects the route change of the own vehicle, the act-of-looking-aside determiner refrains from determining that the driver is in the act-of-looking-aside state even when the line-of-sight direction of the driver deviates from the determination reference range after the line-of-sight direction of the driver detected by the line-of-sight direction detector is detected as a line-of-sight direction toward at least one of a rearview mirror and a side mirror determined based on a relative position between the own vehicle and the other vehicle, the rearview mirror and the side mirror being provided in the own vehicle.

2. The act-of-looking-aside determination device according to claim 1, wherein the route change detector detects a lane change of the own vehicle, as the route change of the own vehicle, and when the route change detector detects the lane change of the own vehicle, the act-of-looking-aside determiner refrains from determining that the driver is in the act-of-looking-aside state even when the line-of-sight direction of the driver deviates from the determination reference range after the line-of-sight direction of the driver detected by the line-of-sight direction detector is detected as a line-of-sight direction toward at least one of the rearview mirror and the side mirror determined based on the relative position between the own vehicle and the other vehicle, the rearview mirror and the side mirror being provided in the own vehicle.

3. The act-of-looking-aside determination device according to claim 1, wherein when a distance in an extending direction of a lane between the own vehicle and the other vehicle detected by the surrounding vehicle detector is larger than a predetermined threshold value, the act-of-looking-aside determiner refrains from determining that the driver is in the act-of-looking-aside state even when the line-of-sight direction of the driver deviates from the determination reference range after the line-of-sight direction detector detects that the line-of-sight direction of the driver is directed to the rearview mirror, and when the distance in the extending direction of the lane between the own vehicle and the other vehicle detected by the surrounding vehicle detector is smaller than the predetermined threshold value, the act-of-looking-aside determiner refrains from determining that the driver is in the act-of-looking-aside state even when the line-of-sight direction of the driver deviates from the determination reference range after the line-of-sight direction detector detects that the line-of-sight direction of the driver is directed to the side mirror.

4. The act-of-looking-aside determination device according to claim 3, wherein the predetermined threshold value is variably set based on information related to a shape of a road on which own vehicle is traveling.

5. The act-of-looking-aside determination device according to claim 1, wherein the route change detector detects the route change of the own vehicle based on a blinking state of a direction indicator of the vehicle and/or a steering state of the vehicle.

* * * * *